US011451426B2

(12) United States Patent
Chae et al.

(10) Patent No.: US 11,451,426 B2
(45) Date of Patent: Sep. 20, 2022

(54) METHOD AND TERMINAL FOR TRANSMITTING FEEDBACK SIGNAL IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 17/255,327

(22) PCT Filed: Jun. 25, 2019

(86) PCT No.: PCT/KR2019/007670
§ 371 (c)(1),
(2) Date: Dec. 22, 2020

(87) PCT Pub. No.: WO2020/004910
PCT Pub. Date: Jan. 2, 2020

(65) Prior Publication Data
US 2021/0266212 A1 Aug. 26, 2021

(30) Foreign Application Priority Data
Jun. 25, 2018 (KR) .......................... 10-2018-0073001

(51) Int. Cl.
*H04L 27/26* (2006.01)
*H04W 4/40* (2018.01)
(Continued)

(52) U.S. Cl.
CPC ........ *H04L 27/2646* (2013.01); *H04L 5/0048* (2013.01); *H04W 4/40* (2018.02); *H04W 56/0045* (2013.01)

(58) Field of Classification Search
None
See application file for complete search history.

(56) References Cited

U.S. PATENT DOCUMENTS 8,917,679 B2* 12/2014 Lindh .................. H04L 5/0026
370/480
11,270,127 B1* 3/2022 Kirch ...................... G01S 17/42
(Continued)

FOREIGN PATENT DOCUMENTS

| KR | 1020130046713 | 5/2013 |
| KR | 1020130059788 | 6/2013 |

(Continued)

OTHER PUBLICATIONS

PCT International Application No. PCT/KR2019/007670, International Search Report dated Oct. 23, 2019, 10 pages.

*Primary Examiner* — Otis L Thompson, Jr.
(74) *Attorney, Agent, or Firm* — Lee Hong Degerman Kang Waimey

(57) ABSTRACT

One embodiment of the present invention provides a method for transmitting, by a receiving terminal, a feedback signal to a transmitting terminal in a wireless communication system, the method comprising the steps of: receiving, by the receiving terminal, a reference signal from the transmitting terminal; and transmitting, by the receiving terminal, the feedback signal for the reference signal to the transmitting terminal, wherein the feedback signal is transmitted on the basis of compensation for a phase change that occurs when the reference signal is received.

14 Claims, 13 Drawing Sheets

(51) Int. Cl.
*H04L 5/00* (2006.01)
*H04W 56/00* (2009.01)

(56) References Cited

U.S. PATENT DOCUMENTS

| | | | |
|---|---|---|---|
| 2011/0158343 A1* | 6/2011 | Park | H04L 25/0228 375/285 |
| 2012/0032855 A1 | 2/2012 | Reede et al. | |
| 2014/0286202 A1* | 9/2014 | Song | H04B 7/0604 370/278 |
| 2016/0119940 A1* | 4/2016 | Wang | H04W 72/12 370/329 |
| 2017/0302352 A1* | 10/2017 | Islam | H04L 25/0204 |
| 2020/0373983 A1* | 11/2020 | Bengtsson | H04B 7/0617 |
| 2022/0078809 A1* | 3/2022 | Zhou | H04L 5/0051 |

FOREIGN PATENT DOCUMENTS

| | | |
|---|---|---|
| WO | 2014043237 | 3/2014 |
| WO | 2018186663 | 10/2018 |

* cited by examiner (a) DMRS location for Rel. 12/13 PSBCH (b) DMRS location for V2V PSBCH (a)

(b)

(a)

(b)

METHOD AND TERMINAL FOR TRANSMITTING FEEDBACK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/007670, filed on Jun. 25, 2019, which claims the benefit of earlier filing date and right of priority to Korean Application No. 10-2018-0073001, filed on Jun. 25, 2018, the contents of which are hereby incorporated by reference herein in its entirety.

TECHNICAL FIELD

The present disclosure relates to a wireless communication system and, more particularly, to a method and terminal for transmitting a feedback signal in a wireless communication system.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

DISCLOSURE

Technical Problem

On object of the present disclosure is to provide a method of transmitting a feedback signal in a wireless communication system.

Another object of the present disclosure is to provide a method of cancelling a distance estimation distortion caused by selective fading when positioning and/or ranging is performed on a frequency selective fading channel based on phase difference of arrival (PDoA).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of transmitting a feedback signal to a transmitting user equipment (UE) by a receiving UE in a wireless communication system is provided. The method may include receiving, by the receiving UE, a reference signal from the transmitting UE and transmitting, by the receiving UE, the feedback signal for the reference signal to the transmitting UE. The feedback signal may be transmitted based on compensation for a phase shift occurring when the reference signal is received.

The compensation for the phase shift may be a phase rotation based on a time difference between a first fast Fourier transform (FFT) window for reference signal transmission at the transmitting UE and a second FFT window for reference signal reception at the receiving UE.

Transmitting the feedback signal to the transmitting UE may include transmitting, by the receiving UE, the feedback single based on a timing of the second FFT window for the reference signal reception.

The compensation for the phase shift may be defined by $a_k \exp(j2\pi(k-x)\Delta f \delta)$, where $a_k$ denotes a complex value of a reference signal transmitted in a k-th frequency resource region, x denotes a reference frequency, $\Delta f$ denotes a subcarrier spacing, and $\delta$ denotes a time difference between the first and second FFT windows.

The compensation for the phase shift may be defined by $a_k \exp(j2\pi(k-x)\Delta f(\delta-\theta))$, where $a_k$ denotes an amplitude of a multipath channel in a k-th frequency resource region, x denotes a reference frequency, $\Delta f$ denotes a subcarrier spacing, $\delta$ denotes a time difference between the first FFT window for reference signal transmission at the transmitting UE and the second FFT window for reference signal reception at the receiving UE, and $\theta$ denotes a time difference between the second FFT window and a third FFT window for feedback signal transmission at the receiving UE.

The compensation for the phase shift may be based on a channel function for the reference signal, and a sequence for the phase-shift compensation based on the channel function may be defined by $$a_k \frac{\lambda}{H(k)},$$

where the channel function is defined by $H(k) = a_k \exp(jB_k)$, $a_k$ denotes an amplitude of a multipath channel in a k-th frequency resource region, and $B_k$ denotes a phase of the multipath channel in the k-th frequency resource region.

The feedback signal may be transmitted by the receiving UE on a same frequency resource as a frequency resource on which the reference signal is received.

The method may include, when there is at least another UE transmitting another feedback signal to the transmitting UE, selecting a transmission resource for transmitting the feedback signal based on at least one of an identifier (ID) of the transmitting UE or an ID of the at least another UE according to sensing results of the receiving UE and transmitting the feedback signal on the selected transmission resource.

Transmitting the feedback signal to the transmitting UE may further include configuring a sequence of the feedback signal based on at least one of an ID of the transmitting UE or an ID of the receiving UE and transmitting the feedback signal to the transmitting UE based on the configured sequence.

The method may further include calculating a distance d between the transmitting and receiving UEs. The distance d may be calculated according to $$d = \frac{c \cdot (\angle \bar{R}(m) - \angle S(m))}{2\pi m \Delta f},$$

where c denotes a speed of light, $\angle \bar{R}(m)$ denotes a phase based on an average of conjugate products of a first reference signal received at a first frequency and a second reference signal received at a second frequency, $\angle S(m)$ denotes a phase based on the phase shift caused by multiple paths, m denotes a spacing between the first and second frequencies, $\Delta f$ denotes a subcarrier spacing, and $\angle$ denotes a function for representing phases. $\bar{R}(m)$ may be defined by $\bar{R}(m)=E(R(k,m))=\exp(j2\pi m \Delta f \partial)E(H(k)H'(k+m))$, where H(k) denotes a multipath channel in a k-th frequency resource region and is defined by $H(k)=a_k \exp(jB_k)$, where $a_k$ denotes an amplitude of the multipath channel in the k-th frequency resource region, and $B_k$ denotes a phase of the multipath channel in the k-th frequency resource region. S(m) may be defined by $$S(m) = \sum_{l=0}^{N-1} E(|h(l)|^2) \exp\left(j\frac{2\pi}{N}lm\right),$$

where N denotes a size of an FFT.

In another aspect of the present disclosure, a receiving UE for transmitting a feedback signal in a wireless communication system is provided. The receiving UE may include a transceiver and a processor. The processor may be configured to receive a reference signal from a transmitting UE and transmit the feedback signal for the reference signal to the transmitting UE. The feedback signal may be transmitted based on compensation for a phase shift occurring when the reference signal is received.

The receiving UE may be configured to communicate with at least one of a mobile terminal, a network, or an autonomous driving vehicle other than an apparatus.

The receiving UE may be configured to implement at least one advanced driver assistance system (ADAS) function based on a signal for controlling movement of the UE.

The UE may be configured to switch a driving mode of an apparatus from an autonomous driving mode to a manual driving mode or from the manual driving mode to the autonomous driving mode upon receipt of a user input.

The receiving UE may be configured to perform autonomous driving based on external object information. The external object information may include at least one of information about presence of an object, information about a location of the object, information about a distance between the receiving UE and the object, or information about a relative speed of the receiving UE 10 with respect to the object.

Advantageous Effects

According to the present disclosure, a receiving user equipment (UE) may transmit a feedback signal in consideration of a phase shift caused by a multipath channel, thereby providing a communication scheme suitable for real communication environments.

According to the present disclosure, a distance between transmitting and receiving UEs may be calculated based on a reference signal transmitted from the transmitting UE, thereby supporting operations of a communication system operating based on the distance.

According to the present disclosure, when a reference signal is transmitted at two tones, and more particularly, i) when a phase difference is extremely small or ii) when the two tones are far away from each other, errors in calculating a distance between transmitting and receiving UEs may be reduced.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
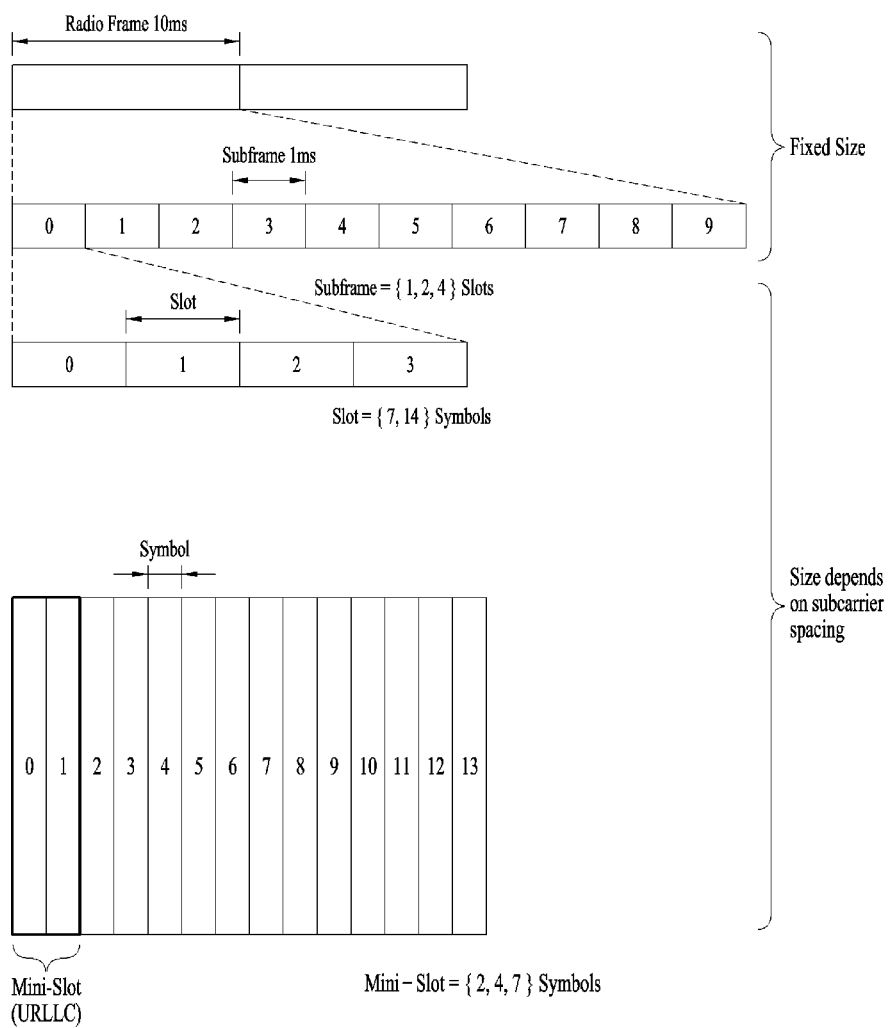
FIG. 1 illustrates a frame structure in new radio (NR).

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of evolved UMTS (E-UMTS) using E-UTRA. LTE-advance (LTE-A) or LTE-A pro is an evolved version of 3GPP LTE. 3GPP new radio or new radio access technology (3GPP NR) is an evolved version of 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (PCell) or PCC, and a cell operating on a secondary frequency may be referred to as a secondary cell (SCell) or SCC. The SCell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The SCell may be configured to provide additional radio resources to the UE. The SCell and the PCell may form a set of serving cells for the UE depending on the capabilities of the UE. When the UE is not configured with carrier aggregation or does not support the carrier aggregation although the UE is in the RRC_CONNECTED state, only one serving cell configured with the PCell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from OFDMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits DCI, UL data, or a random access signal on or over the corresponding UL physical channel. When it is said that the BS receives a UL physical channel, it may mean that the BS receives DCI, UL data, a random access signal on or over the corresponding UL physical channel. When it is said that the BS transmits a DL physical channel (e.g., PDCCH, PDSCH, etc.), it may mean that the BS transmits DCI or UL data on or over the corresponding DL physical channel. When it is said that the UE receives a DL physical channel, it may mean that the UE receives DCI or UL data on or over the corresponding DL physical channel.

In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, CSI collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or μ). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of μ for a bandwidth part and a CP may be obtained by RRC parameters provided by the BS.

TABLE 1

| μ | $\Delta f = 2^{\mu} *15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
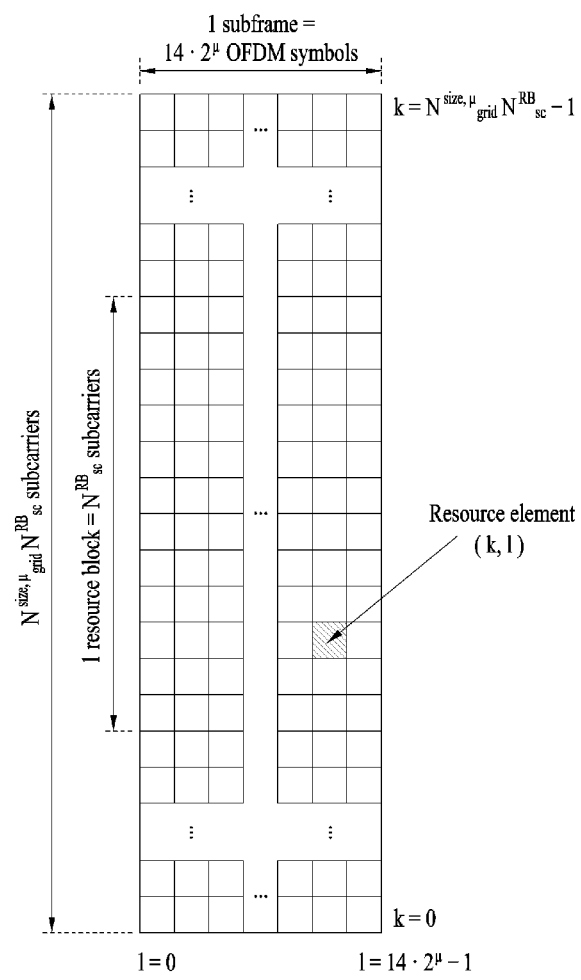
FIG. 2 illustrates a resource grid in NR.

FIG. 2 illustrates a resource grid in the NR.

Referring to FIG. 2, a resource grid consisting of Nsize, μgrid*NRBsc subcarriers and 14*2μ OFDM symbols may be defined for each subcarrier spacing configuration and carrier, where Nsize,μgrid is indicated by RRC signaling from the BS. Nsize,μgrid may vary not only depending on the subcarrier spacing configuration μ but also between UL and DL. One resource grid exists for the subcarrier spacing configuration μ, an antenna port p, and a transmission direction (i.e., UL or DL). Each element in the resource gird for the subcarrier spacing configuration μ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration μ and the antenna port p may be a physical resource and a complex value, a(p,μ)k,l. A resource block (RB) is defined as NRBsc consecutive subcarriers in the frequency domain (where NRBsc=12).

Considering that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology M in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
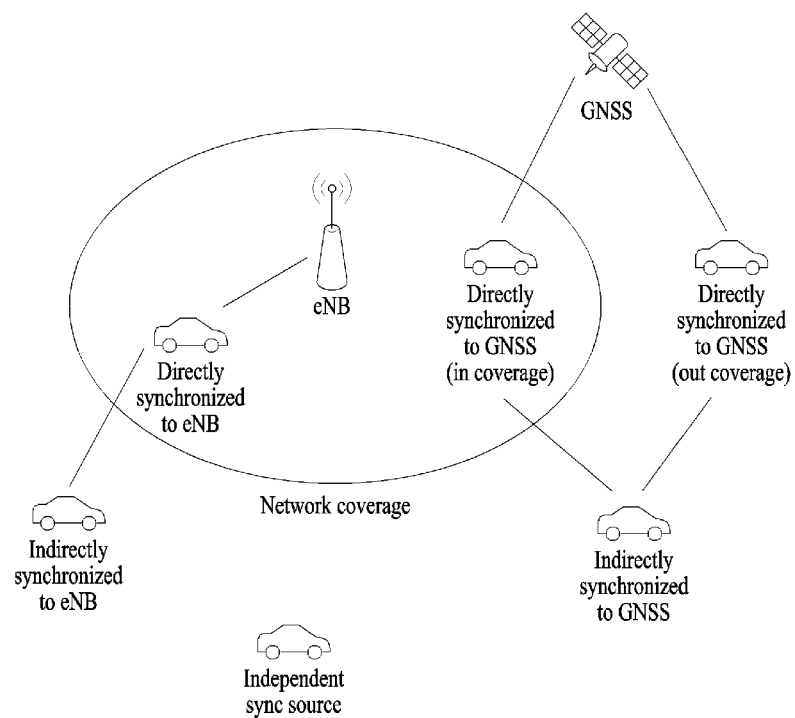
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a PCell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
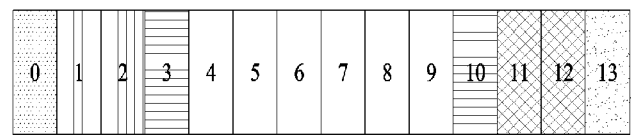
FIG. 4 illustrates a time resource unit for transmitting a sidelink synchronization signal.
Figure 4:
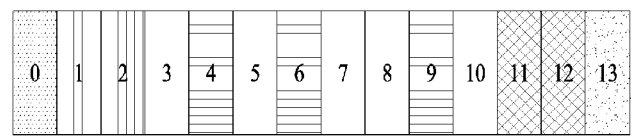
Figure 4:
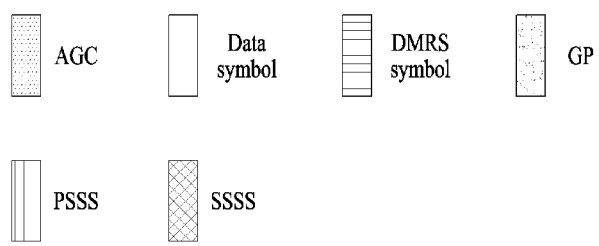

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 5:
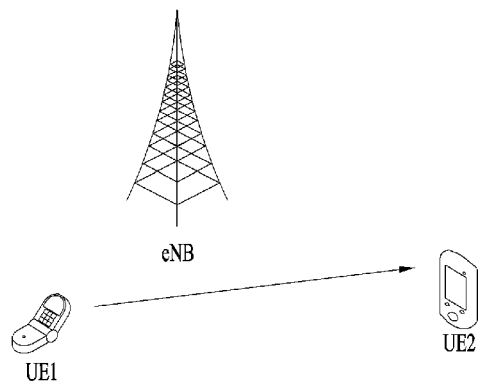
FIG. 5 illustrates a sidelink resource pool.
Figure 5:
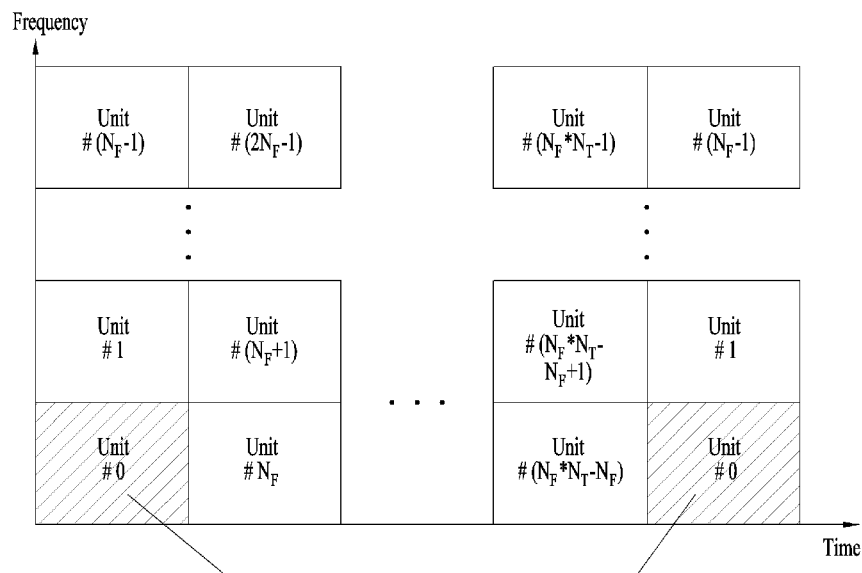

FIG. 5 shows an example of a first UE (UE1), a second UE (UE2) and a resource pool used by UE1 and UE2 performing sidelink communication.

Figure 8:
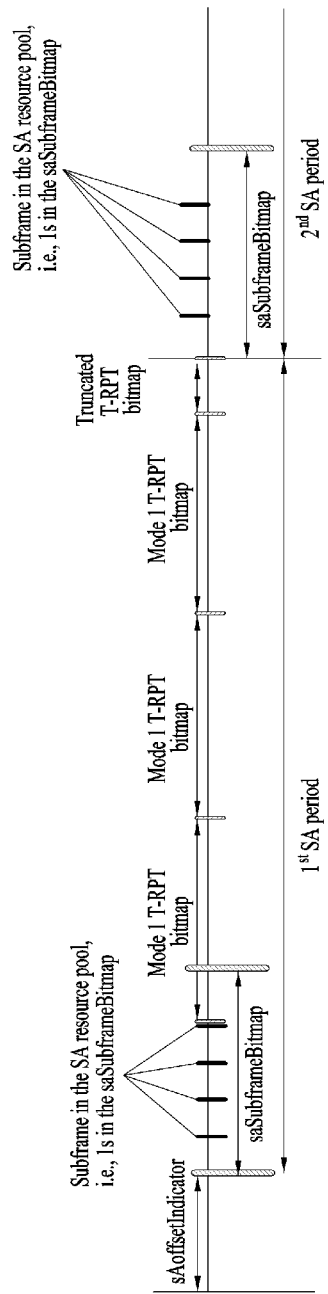
FIG. 8 illustrates transmission of a physical sidelink control channel (PSCCH).

In FIG. 5(*a*), a UE corresponds to a terminal or such a network device as a BS transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located in the coverage of a BS, the BS may inform UE1 of the resource pool. If UE1 is located out of the coverage of the BS, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(*b*) shows an example of configuring a resource unit. Referring to FIG. 8(*b*), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Alternatively, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel. In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether a BS configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the BS, the transmission power of a sidelink UE, and so on. In sidelink communication, a mode in which a BS directly indicates transmission resources to a sidelink transmitting UE is referred to as sidelink transmission mode 1, and a mode in which a transmission resource area is preconfigured or the BS configures a transmission resource area and the UE directly selects transmission resources is referred to as sidelink transmission mode 2. In sidelink discovery, a mode in which a BS directly indicates resources is referred to as Type 2, and a mode in which a UE selects transmission resources directly from a preconfigured resource area or a resource area indicated by the BS is referred to as Type 1.

In V2X, sidelink transmission mode 3 based on centralized scheduling and sidelink transmission mode 4 based on distributed scheduling are available.

Figure 6:
FIG. 6 illustrates scheduling schemes based on sidelink transmission modes.
Figure 6:
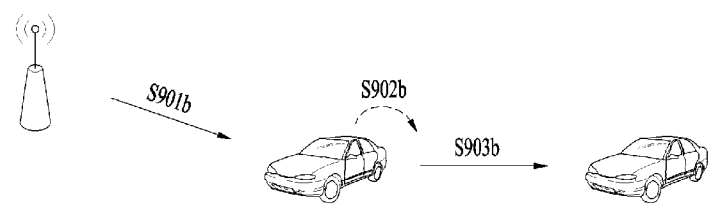

FIG. 6 illustrates scheduling schemes based on these two transmission modes. Referring to FIG. 6, in transmission mode 3 based on centralized scheduling of FIG. 6(*a*), a vehicle requests sidelink resources to a BS (S901*a*), and the BS allocates the resources (S902*a*). Then, the vehicle transmits a signal on the resources to another vehicle (S903*a*). In the centralized transmission, resources on another carrier may also be scheduled. In transmission mode 4 based on distributed scheduling of FIG. 6(*b*), a vehicle selects transmission resources (S902*b*) by sensing a resource pool, which is preconfigured by a BS (S901*b*). Then, the vehicle may transmit a signal on the selected resources to another vehicle (S903*b*).

Figure 7:
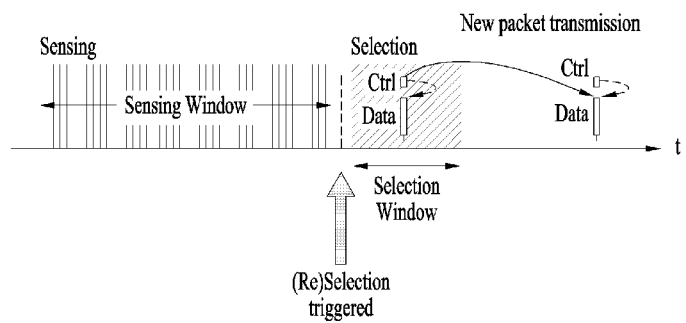
FIG. 7 illustrates selection of sidelink transmission resources.

When the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

In sidelink transmission mode 1, a UE may transmit a PSCCH (sidelink control signal, SCI, etc.) on a resource configured by a BS. In sidelink transmission mode 2, the BS may configure resources used for sidelink transmission for the UE, and the UE may transmit the PSCCH by selecting a time-frequency resource from among the configured resources.

FIG. 8 shows a PSCCH period defined for sidelink transmission mode 1 or 2.

Referring to FIG. 8, a first PSCCH (or SA) period may start in a time resource unit apart by a predetermined offset from a specific system frame, where the predetermined offset is indicated by higher layer signaling. Each PSCCH period may include a PSCCH resource pool and a time resource unit pool for sidelink data transmission. The PSCCH resource pool may include the first time resource unit in the PSCCH period to the last time resource unit among time resource units indicated as carrying a PSCCH by a time resource unit bitmap. In mode 1, since a time-resource pattern for transmission (T-RPT) or a time-resource pattern (TRP) is applied, the resource pool for sidelink data transmission may include time resource units used for actual transmission. As shown in the drawing, when the number of time resource units included in the PSCCH period except for the PSCCH resource pool is more than the number of T-RPT bits, the T-RPT may be applied repeatedly, and the last applied T-RPT may be truncated as many as the number of remaining time resource units. A transmitting UE performs transmission at a T-RPT position of 1 in a T-RPT bitmap, and transmission is performed four times in one MAC PDU.

Figure 9:
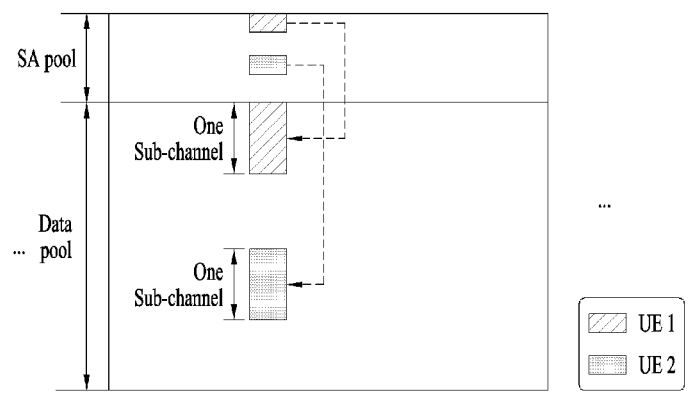
FIG. 9 illustrates PSCCH transmission in sidelink vehicle-to-everything (V2X) communication.
Figure 9:
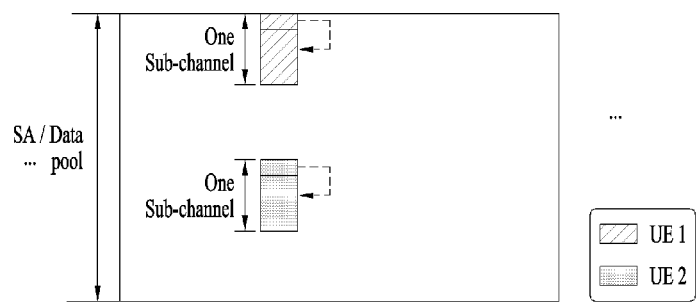

In V2X, that is, sidelink transmission mode 3 or 4, a PSCCH and data (PSSCH) are frequency division multiplexed (FDM) and transmitted, unlike sidelink communication. Since latency reduction is important in V2X in consideration of the nature of vehicle communication, the PSCCH and data are FDM and transmitted on the same time resources but different frequency resources. FIG. 9 illustrates examples of this transmission scheme. The PSCCH and data may not be contiguous to each other as illustrated in FIG. 9(a) or may be contiguous to each other as illustrated in FIG. 9(b). A subchannel is used as the basic unit for the transmission. The subchannel is a resource unit including one or more RBs in the frequency domain within a predetermined time resource (e.g., time resource unit). The number of RBs included in the subchannel, i.e., the size of the subchannel and the starting position of the subchannel in the frequency domain are indicated by higher layer signaling.

For V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that can be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple 5G use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Fading

Fading refers to signal attenuation that occurs over a short period of time, and it may be caused by various factors. In particular, multipath fading means that a signal is dispersed over multiple paths due to reflection, scattering, etc. The multipath fading may cause delay spread and signal distortion. The delay spread, which is caused by the movement of a mobile station, is referred to as "Doppler effect". The movement of the mobile station may cause the same effect when the center frequency of a signal is shifted. This may cause frequency shift and scattering phenomenons.

Hereinafter, shadow fading is described. When a signal is transmitted through various paths, there may be a shadow area due to buildings, tunnels, etc. In the real environment, a signal may be attenuated by trees, buildings, etc. so that the signal strength may change. In addition, the path loss may vary depending on the actual surrounding environment (multiple reflections and/or scatterings). The path loss may be corrected by a path loss model (e.g., a two-ray model). That is, the shadow fading causes signal reception failure or any reduction in the signal strength in the shadow area.

Selective fading or frequency selective fading occurs when the coherent bandwidth is smaller than the signal frequency bandwidth or when the delay spread is longer than the symbol length, and it relates to multipath channel responses. A radio signal experiences various fading conditions (different attenuation, different phases, etc.) while passing through a multipath channel. Thus, when fading is measured in a radio communication link, it may be observed that attenuation increases at a specific reception frequency compared to other reception frequencies. The fading channel may cause severe inter-symbol interference (ISI) in CDMA communication.

In the OFDMA system, the frequency selective fading may be used for frequency-selective user scheduling schemes or frequency diversity schemes to increase overall system gains.

Time selective fading is caused by Doppler spread, and the fading degree varies over time. The time selective fading is divided into fast fading and slow fading depending on how fast a transmitted signal changes according to channel variations.

When an object (e.g., mobile station) moves at a high speed, a received signal is condensed so that the bandwidth increases. Thus, the coherence time is shorter than the pulse duration (Tc=9/(16*pi*fd)). That is, when the frequency bandwidth increases, the coherence time decreases. When the coherence time is shorter than the minimum pulse duration, distortion may occur. This phenomenon is referred to as the fast fading. Generally, the signal distortion increases when the Doppler spread is greater than the transmission frequency. In the real environment, the fast fading occurs only when data is transmitted at a low speed. However, when the coherence time is longer than the minimum pulse duration, that is, when there are no distortions, it may be referred to as the slow fading.

The present disclosure proposes a method for a receiving UE to transmit a feedback signal to a transmitting UE in a wireless communication system. In addition, the present disclosure proposes a high-resolution distance estimation method based on phase difference of arrival (PDoA). In the present disclosure, the transmitting UE may be referred to as a Tx UE or UE A, and the receiving UE may be referred to as a Rx UE or UE B.

Figure 10:
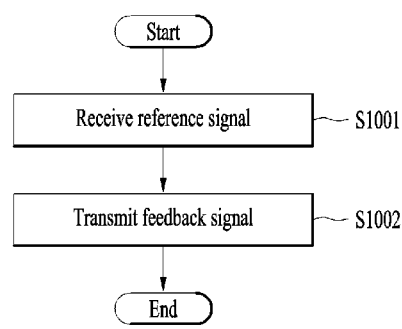
FIG. 10 is a flowchart showing operations of a user equipment (UE) according to an embodiment of the present disclosure.

FIG. 10 is a flowchart showing operations of a UE according to the present disclosure. The UE may perform step S1001 and then perform step S1002. However, it may not mean that the UE should perform all of the steps or can perform only the steps.

Referring to FIG. 10, the method for a receiving UE to transmit a feedback signal to a transmitting UE in a wireless communication system may include receiving, by the receiving UE, a reference signal from the transmitting UE (S1001) and transmitting, by the receiving UE, the feedback signal for the reference signal to the transmitting UE. The feedback signal may be transmitted based on compensation for a phase shift that occurs when the reference signal is received.

The compensation for the phase shift will be described later and/or in Method 2.

For example, the phase-shift compensation may be a phase rotation based on a time difference between a first fast Fourier transform (FFT) window for reference signal transmission at the transmitting UE and a second FFT window for reference signal reception at the receiving UE. Specifically, transmitting the feedback signal to the transmitting UE may include transmitting, by the receiving UE, the feedback signal based on a timing of the second FFT window for the reference signal reception.

In another example, the phase-shift compensation may be defined by $a_k \exp(j2\pi(k-x)\Delta f\delta)$, where $a_k$ denotes a complex value of a reference signal transmitted in a k-th frequency resource region, x denotes a reference frequency, $\Delta f$ denotes a subcarrier spacing, and $\delta$ denotes a time difference between the first and second FFT windows.

In a further example, the phase-shift compensation may be defined by $a_k \exp(j2\pi(k-x)\Delta f(\delta-\theta))$, where $a_k$ denotes an amplitude of a multipath channel in a k-th frequency resource region, x denotes a reference frequency, $\Delta f$ denotes a subcarrier spacing, $\delta$ denotes a time difference between the first FFT window for reference signal transmission at the transmitting UE and the second FFT window for reference signal reception at the receiving UE, and $\theta$ denotes a time difference between the second FFT window and a third FFT window for feedback signal transmission at the receiving UE.

In a still further example, the phase-shift compensation may be based on a channel function for the reference signal, and a sequence for the phase-shift compensation based on the channel function may be defined by $$a_k \frac{\lambda}{H(k)},$$

where the channel function is defined by $H(k)=a_k \exp(jB_k)$, $a_k$ denotes an amplitude of a multipath channel in a k-th frequency resource region, and $B_k$ denotes a phase of the multipath channel in the k-th frequency resource region.

The feedback signal may be transmitted by the receiving UE on a same frequency resource as a frequency resource on which the reference signal is received.

When there is at least another UE transmitting another feedback signal to the transmitting UE, the method may further include selecting a transmission resource for transmitting the feedback signal based on at least one of an identifier (ID) of the transmitting UE or an ID of the at least another UE according to sensing results of the receiving UE and transmitting the feedback signal on the selected transmission resource.

Transmitting the feedback signal to the transmitting UE may further include configuring a sequence of the feedback signal based on at least one of an ID of the transmitting UE or an ID of the receiving UE and transmitting the feedback signal to the transmitting UE based on the configured sequence.

Figure 11:
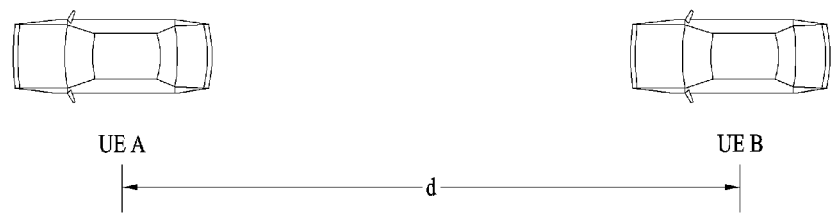
FIG. 11 illustrates a distance d between a transmitting UE (UE A) and a receiving UE (UE B).

FIG. 11 illustrates a distance d between the transmitting UE (UE A) and the receiving UE (UE B).

According to an embodiment of the present disclosure, the distance d between the transmitting and receiving UEs may be calculated. Details will be described later.

In an embodiment of the present disclosure, a method of measuring a distance between wireless communication devices and locations thereof is provided. In particular, when one device intends to measure the distance, the device may measure the distance based on phase information about radio signals exchanged therebetween. Although the present disclosure assumes that two frequencies are used for signal transmission and reception, the present disclosure is not limited to the number of frequencies used for signal transmission and reception. In addition, the present disclosure assumes multiple frequencies are simultaneously transmitted, the present disclosure is applicable when multiple frequencies are transmitted predetermined different times.

First, it is assumed that one UE (Tx UE) transmits a reference signal at two or more frequencies. For example, information about the size and/or phase of the reference signal may be predetermined and known to both the transmitter and receiver. In another example, the Tx UE may transmit the information about the size and/or phase of the reference signal to the Rx UE. Reception of a reference signal at an m-th tone (subcarrier) in the frequency domain may be defined by Equation 1.

$$Y_k = H(k)\exp(-j2\pi k\Delta f\delta) = A_k \exp(jB_k)\exp(-j2\pi k\Delta f\delta) \qquad \text{[Equation 1]}$$

In Equation 1, $A_k$ and $B_k$ denote the amplitude and phase response of a multipath channel at a k-th frequency tone, respectively. A channel function H(k) is defined by $H(k)=A_k \exp(jB_k)$. $\Delta f$ denotes a spacing between subcarriers, and $\delta$ denotes a time offset between the transmitter and receiver in the time domain.

The time offset may include the propagation delay of a radio signal, a sampling time difference between the transmitter and receiver, etc. Further, the time offset may be a time difference between the FFT window of the transmitter (Tx UE) and the FFT window of the receiver (Rx UE). In this document, the multipath channel gain refers to a channel gain obtainable on the assumption that there is no delay (zero delay) in a first channel path. In other words, although a wireless channel has such a time offset, the time offset is separately considered in the present disclosure. The propagation delay may refer to a time required for a signal transmitted from the transmitter (Tx UE) to arrive at the receiver (Rx UE) in a communication system.

When the Rx UE receives signals at two tones, a phase difference between the two tones may be defined by Equation 2 (in this case, it is assumed that the two tone have the same multipath channel phase).

$$\Delta\phi_{m,n} = \angle Y_m - \angle Y_n = 2\pi\Delta f\delta(n-m) \quad \text{[Equation 2]}$$

Assuming that there is no timing error between the transmitter and receiver (Tx and Rx UEs) and the time offset only depends on the propagation delay, $\Delta\phi_{m,n}$ of Equation 2 may be expressed as shown in Equation 3.

$$\Delta\phi_{m,n} = 2\pi\Delta f(n-m)\frac{R}{c} \quad \text{[Equation 3]}$$

A distance between the Tx and Rx UEs, $R_{m,n}$ may be estimated according to Equation 4.

$$R_{m,n} = \frac{c \cdot \Delta\phi_{m,n}}{2\pi\Delta w_{m,n}} \quad \text{[Equation 4]}$$

In Equation 4, $w_{m,n}$ denotes a frequency difference between the two tones, and $\phi_{m,n}$ denotes the phase difference between the two tones, and c denotes the speed of light (about 3*10^8 [m/s]). Equation 4 shows distance estimation in one-way ranging. For two-way ranging, Equation 4 may be multiplied with ½. Here, one-way ranging may correspond to a method by which the receiver measures the propagation delay of the transmitter on the assumption that the transmitter and receiver (Tx and Rx UEs) are synchronized, and the two-way ranging may correspond to a method by which the receiver (Rx UE) provides feedback on a signal from the transmitter (Tx UE) and the transmitter estimates the distance therebetween based on a phase difference.

When the phase of the channel differs at the two tones, the phase difference of Equation 2, $\Delta\phi_{m,n}$ may be modified as shown in Equation 5.

$$\Delta\phi_{m,n} = \angle Y_m - \angle Y_n = 2\pi\Delta f\delta(n-m) + B_m - B_n \quad \text{[Equation 5]}$$

The distance between the Tx and Rx UEs of Equation 4, $R_{m,n}$ may be modified as shown in Equation 6.

$$\hat{R}_{m,n} = \frac{c \cdot (\Delta\phi_{m,n} - (B_m - B_n))}{2\pi\Delta w_{m,n}} = R_{m,n} - \frac{c(B_m - B_n)}{2\pi\Delta w_{m,n}} \quad \text{[Equation 6]}$$

When there is a phase difference due to the multipath channel, a distance estimation error may increase compared to the original distance.

To reduce the phase difference caused by the multipath channel, two tones with the same channel phase may need to be used if possible. However, in this case, since the phase difference between the two tones, which is caused by the distance difference therebetween, is extremely small, it is difficult to perform the distance estimation. On the other hand, when the two tones are far away from each other, the distance estimation error may increase due to frequency selective fading. Here, the frequency selective fading may refer to a phenomenon in which fading occurs only at a specific frequency band (for example, fading characteristics may vary in a signal bandwidth, a channel response may significantly change in a part of the signal bandwidth, or delay spread may occur selectively for each frequency).

To solve the above problem, the following is proposed in an embodiment of the present disclosure.

First, a received signal $Y_k$ at a k-th tone in the frequency domain may be expressed as shown in Equation 7.

$$Y_k = H(k)\exp(-j2\pi k\Delta f\delta) + W(k) \quad \text{[Equation 7]}$$

In Equation 7, W(k) denotes a noise at the k-th frequency tone.

The conjugate product of the received signal at the k-th tone and a received signal at a (k+m)-th tone may be expressed as shown in Equation 8.

$$R(k,m) = Y_k Y^*_{k+m} = \exp(j2\pi m\Delta f\delta)H(k)H^*(k+m) + \Gamma(k)W^*(k+m) + W(k)\Gamma^*(k+m) + W(k)W^*(k+m) \quad \text{[Equation 8]}$$

$\Gamma(k)$ may be calculated according to Equation 9, and $\Gamma^*(k+m)$ may be calculated according to Equation 10.

$$\Gamma(k) = H(k)\exp(-j2\pi k\Delta f\delta) \quad \text{[Equation 9]}$$

$$\Gamma^*(k+m) = H^*(k+m)\exp(j2\pi(k+m)\Delta f\delta) \quad \text{[Equation 10]}$$

The conjugate product of a frequency response at the k-th tone and a frequency response at the (k+m)-th tone may be expressed as shown in Equation 11.

$$H(k)H^*(k+m) = \left(\sum_{l=0}^{L-1} h(l)\exp\left(-j\frac{2\pi}{N}lk\right)\right) \cdot \left(\sum_{n=0}^{L-1} h^*(n)\exp\left(j\frac{2\pi}{N}n(k+m)\right)\right) = \sum_{l=0}^{L-1} |h(l)|^2 \exp\left(j\frac{2\pi}{N}lm\right) + \Phi(k, m) \quad \text{[Equation 11]}$$

In Equation 11, N may denote the FFT size, and L may denote the FFT size or the number of multiple paths. In addition, $\Phi(k, m)$ may be calculated according to Equation 12.

$$\Phi(k, m) = \sum_{l=0}^{L-1} \sum_{n=0, n\neq l}^{L-1} h(l)h^*(n)\exp\left(-j\frac{2\pi}{N}((l-n)k - nm)\right) \quad \text{[Equation 12]}$$

If L denotes the FFT size in Equations 11 and 12, Equations 11 and 12 may be expressed as shown in Equations 13 and 14, respectively.

[Equation 13]
$$H(k)H^*(k+m) = \left(\sum_{l=0}^{N-1} h(l)\exp\left(-j\frac{2\pi}{N}lk\right)\right) \cdot \left(\sum_{n=0}^{N-1} h^*(n)\exp\left(j\frac{2\pi}{N}n(k+m)\right)\right) =$$

$$\sum_{l=0}^{N-1} |h(l)|^2 \exp\left(j\frac{2\pi}{N}lm\right) + \Phi(k,m)$$

[Equation 14]
$$\Phi(k,m) = \sum_{l=0}^{N-1}\sum_{n=0,n\neq l}^{N-1} h(l)h^*(n)\exp\left(-j\frac{2\pi}{N}((l-n)k-nm)\right)$$

The average conjugate product of the k-th tone and the (k+m)-th tone, $\overline{R}(m)$ may be calculated according to Equation 15.

[Equation 15]
$$\overline{R}(m) = E(R(k,m)) = \exp(j2\pi m\Delta f\delta)E(H(k)H^*(k+m)) =$$

$$\exp(j2\pi m\Delta f\delta)\underbrace{\sum_{l=0}^{L-1} E(|h(l)|^2)\exp\left(j\frac{2\pi}{N}lm\right)}_{S(m)}$$

In Equation 15, N may denote the FFT size, and L may denote the FFT size or the number of multiple paths.

If L denotes the FFT size in Equation 15, Equation 15 may be expressed as shown in Equation 16.

[Equation 16]
$$\overline{R}(m) = E(R(k,m)) = \exp(j2\pi m\Delta f\delta)E(H(k)H^*(k+m)) =$$

$$\exp(j2\pi m\Delta f\delta)\underbrace{\sum_{l=0}^{N-1} E(|h(l)|^2)\exp\left(j\frac{2\pi}{N}lm\right)}_{S(m)}$$

In Equation 16, assuming that there is no correlation between different channel taps, $E(\Phi)(k,m))=0$. Thus, a phase shift $S(m)$ due to the multipath channel may be compensated for using a phase value at the m-th tone after an inverse fast Fourier transform (IFFT) operation with a channel delay profile as shown in Equation 12. Here, $\overline{R}(m)$ may be calculated by the average conjugate product of two tones spaced at an interval of m. That is, the Rx UE may calculate the time offset $\delta$ by dividing a value, which is obtained by subtracting the phase value of $S(m)$ from the phase value of the average conjugate product of the two tones spaced at the m interval, by a constant.

$S(m)$ may be calculated by Equation 17.

[Equation 17]
$$S(m) = \sum_{l=0}^{L-1} E(|h(l)|^2)\exp\left(j\frac{2\pi}{N}lm\right)$$

In Equation 17, N may denote the FFT size, and L may denote the FFT size or the number of multiple paths.

If L denotes the FFT size in Equation 17, Equation 17 may be expressed as shown in Equation 18.

[Equation 18]
$$S(m) = \sum_{l=0}^{N-1} E(|h(l)|^2)\exp\left(j\frac{2\pi}{N}lm\right)$$

A timing difference between the Tx and Rx UEs and the distance between the two UEs, d may be calculated by Equations 19 and 20, respectively.

The timing difference between the two UEs may be calculated by Equation 15

[Equation 19]
$$\delta = \frac{\angle\overline{R}(m) - \angle S(m)}{2\pi m\Delta f}$$

The distance between the two UEs may be calculated by Equation 20.

[Equation 20]
$$d = \frac{c \cdot (\angle\overline{R}(m) - \angle S(m))}{2\pi m\Delta f}$$

The distance between the two UEs (Tx and Rx UEs) is calculated on the assumption that the two UEs have the same transmission time. Thus, if this assumption is not valid, the Tx UE is capable of calculating the distance to the Rx UE only when the Rx UE transmits a specific signal. Even if both the Tx and Rx UEs perform signal transmission based on global navigation satellite system (GNSS) timing, the Tx and Rx UEs may not have the same transmission time due to UE clock errors. That is, if the Rx UE receives a signal from the Tx UE after a specific time delay, the time delay may not be related to the distance therebetween. Accordingly, in this case, UE A may estimate the accurate distance to UE B if UE A transmits a specific signal and UE B provides feedback on the specific signal.

Based on the above discussion, the present disclosure proposes the following UE operations.

Method 1) Transmission of Reference Signal (RS) (e.g., Positioning RS and/or Ranging RS)

According to the present disclosure, the Tx UE may transmit an RS to the Rx UE. A specific UE (e.g., Tx UE) transmits the RS at tones spaced at an interval of L in the frequency domain. The RB size for transmitting the RS may be represented as M (for example, M may denote the number of RBs in the same frequency domain). The value of M and/or L may be predetermined or preconfigured, or it may be determined by the Tx UE depending on the state of a channel. When the channel is likely to be a non-line-of-sight (NLOS) channel (or when CSI feedback from a peer UE is determined to be NLOS), the value of L and/or M may increase. L may be preconfigured by a network for each resource pool. Here, the network may be an eNB or a gNB. Unless specified otherwise, the network may be a fixed node connected to a core network. The network may signal specific control information to neighboring UEs. The value of L may increase in considering of multiplexing between multiple UEs. For example, the network may increase the value of L, and more specifically, the network may determine the value of L depending on the number of UEs. To this end, the network may configure the value of L and/or M for each carrier through a physical layer or higher layer signal. In another example, the network may configure the value of L and/or M for each resource pool or slot. The higher layer signal may be RRC signaling. The NLOS state may mean a state in which transmission and reception antennas are not aligned along a straight line within the beamwidth of the antenna or a state in which the line-of-sight (LOS) condition is not satisfied, that is, there is an obstacle in the propagation path between the transmitted and received in wireless communication.

In direction communication between UEs (e.g., D2D, V2X, etc.), an RS for positioning/ranging (e.g., PRS, ranging RS, etc.) may be allocated to consecutive tones in the frequency domain. For example, the RS may be transmitted on resources with consecutive indices. The reason for this is that when transmission is performed on consecutive frequency tones, the amount of inband emission interference decreases. However, to increase the signal-to-noise ratio (SNR) per resource (e.g., resource element (RE), tone, subcarrier, etc.) for RS transmission, tones may be discontinuous in a specific symbol. How many symbols are used to transmit the positioning/ranging RS and/or which symbols are used to transmit the positioning/ranging RS may be predetermined, autonomously determined by the Tx UE, or configured by the network.

The UE may transmit the RS for positioning/ranging (e.g., PRS, ranging RS, etc.) on a specific CC without using all frequency resources. This may be referred to as narrowband transmission. On the other hand, the UE may transmit the RS for positioning/ranging on the entire bands in the CC or in a frequency region having a predetermined size or larger. This may be referred to as wideband transmission. The UE may determine whether to use the narrowband transmission or wideband transmission depending on interference from a neighboring UE or the channel state. If the channel busy ratio (CBR) measured by the UE in a specific resource region (e.g., a resource region in which the RS for ranging/positioning is transmitted) or the SNR is less than a predetermined threshold, the transmission method to be used may be predetermined or signaled by the network.

When the Tx UE transmits the ranging/positioning RS, the location of an RE (e.g., time, time shift, frequency, frequency shift, etc.) for transmitting the RS and/or the sequence of the RS may be determined according to at least one of the ID of the Tx UE, UE types, service types, or application types. For example, the location of the RE for transmitting the RS or an RS initialization parameter may be determined based on the ID (UE ID) of the Tx UE.

In this case, a set of RSs and/or a radio resource region (time and/or frequency region) transmitted from the Tx UE may be configured differently depending on GNSS-based position information about the UE. For example, an RS set available when a specific UE is in a specific area (e.g., area A) may be different from an RS set available when the UE is in a different area (e.g., area B geologically different from area A). Different RS sets may mean not only different sequence sets but different initialization parameters configured during sequence generation.

When a UE transmits a ranging signal, the hidden node problem may occur (if a UE outside the sensing range transmits the same ranging signal). To solve the hidden node problem, UEs in the hidden node range are configured to use different RS sets. Since different RSs are used, it is possible to prevent collisions and improve ranging performance even though the same resources are used.

The reason for dividing the resource region is to reduce the near-far effect when a narrow-band signal is transmitted in D2D communication. Here, the near-far effect may refer to a phenomenon in which a signal from a far UE is not received due to a signal transmitted from a near UE. The near-far problem (or near-far effect) and/or hearability problem is the effect of a strong signal from a near signal source that makes it difficult for a receiver to hear weak signals from other signal sources. It may occur due to adjacent-channel interference, co-channel interference, distortion, capture effect, dynamic range limitation, and so on. Even if OFDM waveforms are used, interference may occur even in a non-allocated RB due to inband emission. In addition, when the distance between UEs using the same time resource is far apart, if received power at different frequencies is significantly different from the viewpoint of the Rx UE, the above near-far effect may occur. In this case, if adjacent UEs use the same time resources, the above near-far effect may be reduced.

Method 2) Time Offset Estimation Method

When the Tx UE transmits a specific RS according to Method 1, the Rx UE receiving the specific RS may estimate $\delta$ (the time offset between the FFT windows of the Tx and Rx UEs). In this case, the following feedback signal transmission operation may be considered.

The Rx UE may adjust its transmission timing such that the time offset $\delta$ becomes zero or rotate the phase of the transmitted RS with a function of the time offset $\delta$ to obtain the same effect.

In this document, the transmitted RS may be represented with $a_k$ ($a_k$ or $A_k$). Here, $a_k$ denotes the complex value of an RS transmitted in a k-th frequency resource region (e.g., tone). The present disclosure propose the following methods to determine the RS sequence of a feedback signal transmitted from the Rx UE to the Tx UE and the location of a frequency resource region (e.g., tone) used for transmitting the feedback signal.

Method of Determining Frequency Resource Location (Set of K Values in $a_k$)

Hereinafter, a description will be given of a method of transmitting a feedback signal (e.g., feedback RS) at the same location of a resource used for an RS received by the Rx UE when the Rx UE intends to transmit the feedback signal and/or feedback information to the Tx UE. The feedback signal may be transmitted by the Rx UE on the same frequency resource as the frequency resource on which the RS is received. As described above, $a_k$ represents the complex value of the RS transmitted in the k-th frequency resource region (e.g., tone).

This method is advantageous in that channel effects may be canceled by channel reciprocity if channel information is compensated and transmitted, which will be described later, and the implementation complexity of the receiver (Rx UE) may be reduced.

Hereinbelow, a description will be given of a method by which the Rx UE autonomously selects one of a plurality of resources associated with an RS, which is transmitted from the Tx UE to the Rx UE, or a resource used for transmitting the RS when the Rx UE attempts to transmit a feedback signal to the Tx UE.

According to an embodiment of the present disclosure, when there is at least another UE (except the Rx UE) that intends to transmit another feedback signal to the Tx UE, the Rx UE may select a transmission resource for transmitting its feedback signal based on at least one of the ID of the Tx UE or the ID of the at least another UE and transmit the feedback signal on the selected transmission resource according to sensing results of the Rx UE.

When there are a plurality of Rx UEs receiving a positioning signal and/or a ranging signal (e.g., PRS, ranging RS, etc.) from the Tx UE, the plurality of Rx UEs may simultaneously transmit feedback signals (or feedback information). To prevent a collision between the feedback signals (or feedback information) simultaneously transmitted from the plurality of Rx UEs, a plurality of resources may be configured. In this case, a specific resource may be selected from among the plurality of configured resources i) through sensing of the Tx UE and/or Rx UE, ii) by the implementation of the Tx UE and/or Rx UE, or iii) by the ID of the Tx UE and/or Rx UE. For example, the sensing of the Rx UE may mean detecting (or discovering) a plurality of other Rx UEs transmitting feedback signals (or feedback information) or detecting (or discovering) signals (or information) transmitted (or broadcast) from the plurality of other Rx UEs. As another example, the sensing of the Rx UE may refer to an operation of identifying transmission resources reserved by other UEs or resources used by the other UEs through sensing in a sensing window.

Method of Determining RS Sequence (Method of Determining Feedback Signal Sequence)

According to the present disclosure, transmission of a feedback signal to the Tx UE may further include configuring the sequence of the feedback signal based on at least one of the ID of the Tx UE or the ID of the Rx UE and transmitting the feedback signal to the Tx UE based on the configured sequence.

A pseudo random sequence mapped to $a_k$ ($a_k$ or $A_k$) may be generated based on i) the ID of the Tx UE, ii) the ID of the Rx UE receiving the sequence, or iii) the IDs of the two UEs. Here, $a_k$ represents the complex value of the RS transmitted in the k-th frequency resource region (e.g., tone). The Tx UE may be a UE transmitting an RS in process 1 described above, and the Rx UE may be a UE (successfully) receiving the RS in process 1.

For example, the initialization parameter of a random sequence may be determined based on the ID of the Tx UE (Tx UE ID) and/or the ID of the Rx UE (Rx UE ID).

When a UE intends to transmit a feedback signal, the UE may perform post-processing on $a_k$ instead of simply transmitting $a_k$. Here, post-processing may refer to phase compensation and/or amplitude compensation.

Channel Compensation Method

The phase-shift compensation according to the present disclosure may be determined based on a channel function for the RS. The Rx UE may estimate the time offset δ according to Equation 19 and also estimate the channel component H(k) based on the time offset δ according to Equation 7. A sequence may be transmitted after the channel component H(k) is divided by $a_k$ as shown in Equation 21.

$$a_k \frac{\lambda}{H(k)} \qquad \text{[Equation 21]}$$

In Equation 21, λ is a parameter for power normalization. For example, the channel component H(k) may be defined as follows: $H(k)=A_k \exp(jB_k)$. In addition, $a_k$ denotes the amplitude of the multipath channel in the k-th frequency resource region, and $B_k$ denotes the phase of the multipath channel in the k-th frequency resource region.

Alternatively, only the phase of the channel may be compensated for, which may be expressed as shown in Equation 22.

$$a_k \exp(-jB_k) \qquad \text{[Equation 22]}$$

The above method allows a UE receiving a feedback signal to observe only a phase shift due to a propagation delay with no channel component, thereby omitting the calculation processes in Equations 15 to 20. Therefore, the implementation complexity of the Rx UE may be reduced.

In this case, the Rx UE may estimate the time offset δ. That is, the Rx UE may estimate a time offset difference instead of directly estimating the distance d between the Tx and Rx UEs.

Therefore, when the RS is transmitted after compensating for only (the phase value of) the channel, the time offset δ may be explicitly signaled. The time offset δ may be explicitly encoded in a specific field and transmitted. Alternatively, the phase of the transmitted RS may be changed, or a delay may be applied to the transmitted signal in consideration of the time offset δ. Details are be described below.

Time Offset Compensation Method

Figure 12:
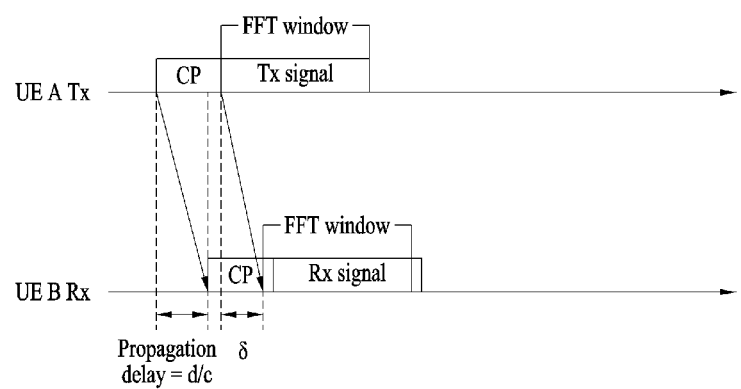
FIG. 12 is a diagram for explaining a time offset between fast Fourier transform (FFT) windows of transmitting and receiving Rx UEs (UEs A and B) and a propagation delay according to an embodiment of the present disclosure.

FIG. 12 is a diagram for explaining a time offset δ between FFT windows of Tx and Rx UEs (UEs A and B) and a propagation delay according to an embodiment of the present disclosure.

The Rx UE may transmit, to the Tx UE, a feedback signal for an RS received from the Tx UE, and in this case, the feedback signal may be transmitted based on compensation for a phase shift that occurs when the RS is received.

The compensation for the phase shift may be a phase rotation based on the time difference between the first FFT window for the RS transmission at the Tx UE and the second FFT window for the RS reception at the Rx UE. Specifically, the feedback signal transmission from the Rx UE may include that the Rx UE transmits the feedback signal based on the timing of the second FFT window for the RS reception.

To obtain the same effect without any changes in the FFT window of the Rx UE, the phase of the RS needs to be rotated by −δ. The rotation may be expressed as shown in Equation 23.

$$a_k \exp(j2\pi(k-x)\Delta f \delta) \qquad \text{[Equation 23]}$$

As described above, $a_k$ represents the complex value of the RS transmitted in the k-th frequency resource region (e.g., tone). In Equation 23, x denotes the index of a reference tone. The reference tone may be fixed to a specific value (e.g., x=0), or a specific tone in the frequency region where the Tx UE transmits the RS may be designated as the reference tone and/or reference point. For example, the Tx UE may set to the reference tone and/or reference point i) the lowest subcarrier index of a tone at which the RS is transmitted or ii) a specific tone corresponding to the lowest subcarrier index of an RB in which the RS is transmitted. Considering that the phase difference between tones needs to be constant, the value of x (the index of the reference tone) needs to be only a fixed constant from the perspective of the UE transmitting the RS. In Equation 23, Δf denotes the spacing between subcarriers, and the subcarriers may correspond to a frequency region in which a plurality of RSs are transmitted.

Since the above method may guarantee the same effects as when the time offset δ is effectively transmitted in advance in the time domain, the peer UE may estimate a propagation delay. This is illustrated in FIG. 13.

Figure 13:
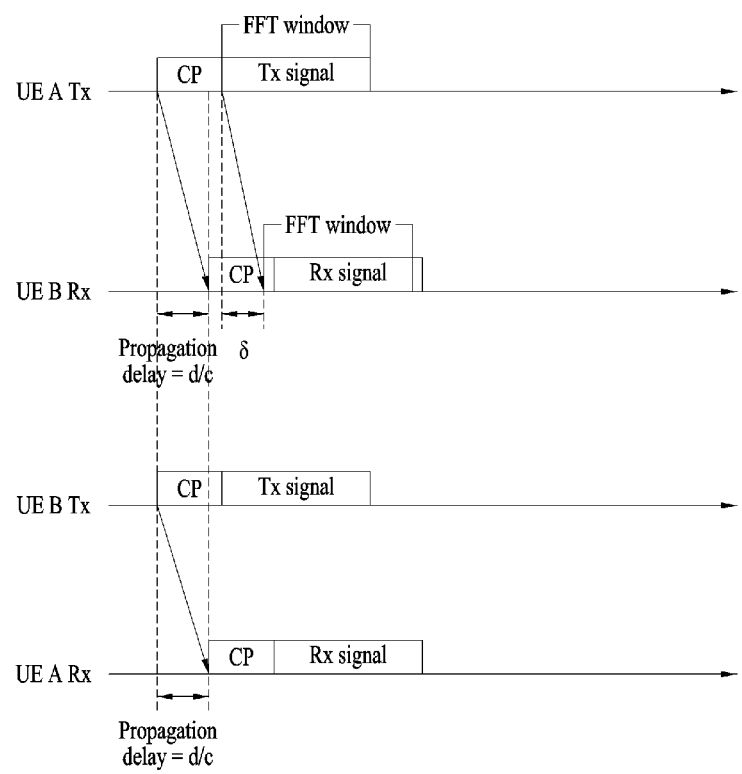
FIG. 13 is a diagram for explaining a time offset between FFT windows of transmitting and receiving Rx UEs (UEs A and B) and a propagation delay according to another embodiment of the present disclosure.

FIG. 13 is a diagram for explaining a time offset δ between FFT windows of Tx and Rx UEs (UEs A and B) and a propagation delay according to another embodiment of the present disclosure.

The Rx UE may transmit, to the Tx UE, a feedback signal for an RS received from the Tx UE, and in this case, the feedback signal may be transmitted based on compensation for a phase shift that occurs when the RS is received.

If there is a difference between the FFT window when UE B (Rx UE) receives the RS from UE A (Tx UE) and the FFT window when the UE B provides feedback thereon, UE B may change the phase value in consideration of the difference. The Rx UE (UE B) may transmit the feedback signal (RS sequence) to the Tx UE (UE A) according to Equation 24.

$$a_k \exp(j2\pi(k-x)\Delta f(\delta-\theta))$$ [Equation 24]

In Equation 24, $a_k$ denotes the amplitude of the multipath channel in the k-th frequency resource region, x denotes a reference frequency, and $\Delta f$ denotes the subcarrier spacing.

In addition, $\delta$ denotes the time difference between the first FFT window for the RS transmission at the Tx UE and the second FFT window for the RS reception at the Rx UE.

$\theta$ denotes a difference between a reception FFT window and a transmission FFT window. For example, $\theta$ may denote a time difference between the second FFT window and a third FFT window for feedback signal transmission at the Rx UE. The value of $\theta$ may be configured by reflecting a change in the FFT window when a UE simultaneously feeds back/returns signals from multiple UEs. The value of $\theta$ may be fixed or determined by UE implementation.

According to the present disclosure, the Rx UE may simultaneously compensate for the time offset and channel according to Equation 25.

$$a_k \frac{\lambda}{A_k \exp(jB_k)} \exp(j2\pi(k-x)\Delta f(\delta-\theta))$$ [Equation 25]

Alternatively, the Rx UE may compensate for only the phase of the channel according to Equation 26.

$$a_k \lambda \exp(-jB_k)\exp(j2\pi(k-x)\Delta f(\delta-\theta))$$ [Equation 26]

The methods related to Equations 25 and 26 may not require explicit signaling about the time offset $\delta$ and, at the same time, may compensate for the channel, thereby reducing the computation complexity of the receiver (e.g., UE B (Rx UE)).

When processing is performed on a positioning/ranging RS before transmission thereof as in the above methods, the corresponding RS may not be used for data demodulation. In this case, a known sequence for data demodulation may be transmitted together.

Method 3) Upon receiving the RS from the Rx UE according to Methods 1 and 2, the Tx UE may measure a distance to a specific UE according to Equations 19 and 20.

Device Configurations According to Embodiments of the Present Disclosure

Figure 14:
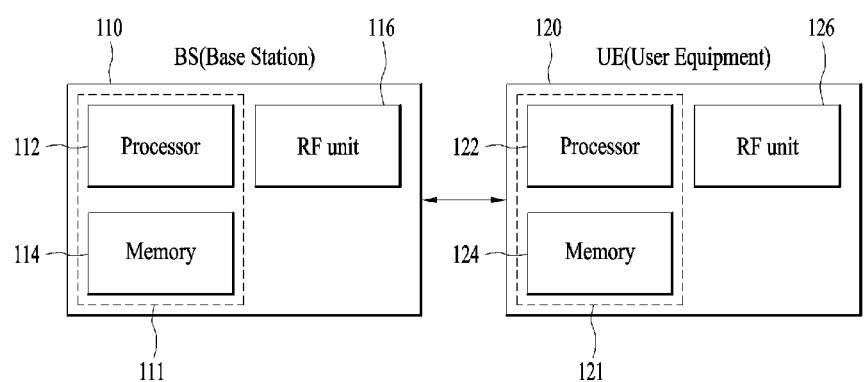
FIG. 14 illustrates apparatuses according to the present disclosure.

Referring to FIG. 14, a wireless communication system includes a BS 110 and a UE 120. When the wireless communication system includes a relay, the BS or UE may be replaced with the relay. The UE 120 may correspond to a Rx UE and/or a relay UE.

The BS device 110 may include a processor 112, a memory 114, and a radio frequency (RF) unit 116. The processor 112 may be configured to perform the described/proposed procedures and methods by controlling the memory 114 and/or the RF unit 116. For example, the processor 112 may generate first information and/or a first signal by processing information in the memory 114 and then control the RF unit 116 to transmit a radio signal containing the first information/signal. The processor 112 may control the RF unit 116 to receive a radio signal containing second information and/or a second signal and then control the memory 114 to store information obtained by processing the second information/signal. The processor 112 may include a communication modem designed suitable for a wireless communication technology (e.g., LTE, NR, etc.). The memory 114 may be connected to the processor 112 and configured to store various information on the operations of the processor 112. For example, the memory 114 may store software code including commands for performing some or all of the processes controlled by the processor 112 or the described/proposed procedures and methods. The RF unit 116 may be connected to the processor 112 and configured to transmit and/or receive a radio signal. The RF unit 116 may include a transmitter and/or a receiver. The RF unit 116 may be replaced with a transceiver. The processor 112 and the memory 114 may be included in a processing chip 111 (e.g., system on chip (SOC)).

The UE device 120 may include a processor 122, a memory 124, and an RF unit 126. The processor 122 may be configured to perform the described/proposed procedures and methods by controlling the memory 124 and/or the RF unit 126. For example, the processor 122 may generate third information or a third signal by processing information in the memory 124 and then control the RF unit 126 to transmit a radio signal containing the third information/signal. The processor 122 may control the RF unit 126 to receive a radio signal containing fourth information or a fourth signal and then control the memory 124 to store information obtained by processing the fourth information/signal. For example, the processor 122 may be configured to select a plurality of resources at two or more frequencies and transmit a sidelink signal on the plurality of selected resources. Further, the processor 122 may be configured to receive an RS from a Tx UE and transmit a feedback signal to the Tx UE. The feedback signal may be transmitted based on compensation for a phase shift occurring when the RS is received.

The processor 122 may include a communication modem designed suitable for a wireless communication technology (e.g., LTE, NR, etc.). The memory 124 may be connected to the processor 122 and configured to store various information on the operations of the processor 122. For example, the memory 124 may store software code including commands for performing some or all of the processes controlled by the processor 122 or the described/proposed procedures and methods. The RF unit 126 may be connected to the processor 122 and configured to transmit and/or receive a radio signal. The RF unit 126 may include a transmitter and/or a receiver. The RF unit 126 may be replaced with a transceiver. The processor 122 and the memory 124 may be included in a processing chip 121 (e.g., SOC).

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure are mainly described based on a signal transmission and reception relationship between the BS and UE. The signal transmission and reception relationship may be equally/similarly applied to signal transmission between the UE and relay or signal transmission between the BS and relay. A specific operation described as performed by the BS may be performed by an upper node of the BS. That is, it is apparent that various operations for communication with the UE may be performed by the BS or other network nodes rather than the BS in a network including a plurality of network nodes including the BS. The term 'base station' may be replaced with 'fixed station', 'Node B', 'eNode B (eNB)', 'gNode B (gNB)', 'access point (AP)', etc. The term 'terminal' may be replaced with 'user equipment (UE)', 'mobile station (MS)', 'mobile subscriber station (MSS)', etc.

The embodiments of the present disclosure may be achieved by various means, for example, hardware, firmware, software, or any combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of transmitting a feedback signal to a transmitting user equipment (UE) by a receiving UE in a wireless communication system, the method comprising:
receiving information related to time-frequency resources for a reference signal;
receiving, by the receiving UE from the transmitting UE, the reference signal through the time-frequency resources,
wherein the reference signal is generated based on pseudo random sequence; and
transmitting, by the receiving UE, the feedback signal for the reference signal to the transmitting UE,
wherein the feedback signal is transmitted based on a phase rotation based on a time difference between a first fast Fourier transform (FFT) window for reference signal transmission at the transmitting UE and a second FFT window for reference signal reception at the receiving UE.

2. The method of claim 1, wherein transmitting the feedback signal to the transmitting UE comprises transmitting, by the receiving UE, the feedback single based on a timing of the second FFT window for the reference signal reception.

3. The method of claim 2, wherein the compensation for the phase shift is defined by $a_k \exp(j2\pi(k-x)\Delta f\delta)$, where $a_k$ denotes a complex value of a reference signal transmitted in a k-th frequency resource region, x denotes a reference frequency, $\Delta f$ denotes a subcarrier spacing, and $\delta$ denotes a time difference between the first and second FFT windows.

4. The method of claim 1, wherein the compensation for the phase shift is defined by $a_k \exp(j2\pi(k-x)\Delta f(\delta-\theta))$, where $a_k$ denotes an amplitude of a multipath channel in a k-th frequency resource region, x denotes a reference frequency, $\Delta f$ denotes a subcarrier spacing, $\delta$ denotes a time difference between the first FFT window for reference signal transmission at the transmitting UE and the second FFT window for reference signal reception at the receiving UE, and $\theta$ denotes a time difference between the second FFT window and a third FFT window for feedback signal transmission at the receiving UE.

5. The method of claim 1, wherein the compensation for the phase shift is based on a channel function for the reference signal, and wherein a sequence for the phase-shift compensation based on the channel function is defined by $$a_k \frac{\lambda}{H(k)},$$

where the channel function is defined by $H(k)=a_k \exp(jB_k)$, $a_k$ denotes an amplitude of a multipath channel in a k-th frequency resource region, and $B_k$ denotes a phase of the multipath channel in the k-th frequency resource region.

6. The method of claim 1, wherein the feedback signal is transmitted by the receiving UE on a same frequency resource as a frequency resource on which the reference signal is received.

7. The method of claim 1, further comprising:
based on presences of at least another UE transmitting another feedback signal to the transmitting UE,
selecting a transmission resource for transmitting the feedback signal based on at least one of an identifier (ID) of the transmitting UE or an ID of the at least another UE according to sensing results of the receiving UE; and
transmitting the feedback signal on the selected transmission resource.

8. The method of claim 1, wherein transmitting the feedback signal to the transmitting UE further comprises:
configuring a sequence of the feedback signal based on at least one of an identifier (ID) of the transmitting UE or an ID of the receiving UE; and
transmitting the feedback signal to the transmitting UE based on the configured sequence.

9. The method of claim 1, further comprising calculating a distance d between the transmitting and receiving UEs, wherein the distance d is calculated according to $$d = \frac{c \cdot (\angle \overline{R}(m) - \angle S(m))}{2\pi m \Delta f},$$

where c denotes a speed of light, $\angle \overline{R}(m)$ denotes a phase based on an average of conjugate products of a first reference signal received at a first frequency and a second reference signal received at a second frequency, $\angle S(m)$ denotes a phase based on the phase shift caused by multiple paths, m denotes a spacing between the first and second frequencies, $\Delta f$ denotes a subcarrier spacing, and $\angle$ denotes a function for representing phases, wherein $\angle \overline{R}(m)$ is defined by
$\overline{R}(m) = E(R(k,m)) = \exp(j2\pi m \Delta f \delta) E(H(k) H'(k+m))$,
where H(k) denotes a multipath channel in a k-th frequency resource region and is defined by $H(k) = a_k \exp(jB_k)$, where $a_k$ denotes an amplitude of the multipath channel in the k-th frequency resource region, and $B_k$ denotes a phase of the multipath channel in the k-th frequency resource region, and wherein S(m) is defined by $$S(m) = \sum_{l=0}^{N-1} E(|h(l)|^2) \exp\left(j\frac{2\pi}{N} lm\right),$$

where N denotes a size of an FFT.

10. A receiving user equipment (UE) for transmitting a feedback signal in a wireless communication system, the receiving UE comprising:
a transceiver; and
a processor configured to:
receive information related to time-frequency resources for a reference signal;
receive, from a transmitting UE, the reference signal through the time-frequency resources,
wherein the reference signal is generated based on pseudo random sequence; and
transmit the feedback signal for the reference signal to the transmitting UE,
wherein the feedback signal is transmitted based on a phase rotation based on a time difference between a first fast Fourier transform (FFT) window for reference signal transmission at the transmitting UE and a second FFT window for reference signal reception at the receiving UE.

11. The receiving UE of claim 10, wherein the receiving UE is configured to communicate with at least one of a mobile terminal, a network, or an autonomous driving vehicle other than the receiving UE.

12. The receiving UE of claim 10, wherein the receiving UE is configured to implement at least one advanced driver assistance system (ADAS) function based on a signal for controlling movement of the receiving UE.

13. The receiving UE of claim 10, wherein the receiving UE is configured to switch a driving mode of the receiving UE from an autonomous driving mode to a manual driving mode or from the manual driving mode to the autonomous driving mode upon receipt of a user input.

14. The receiving UE of claim 10, wherein the receiving UE is configured to perform autonomous driving based on external object information, and wherein the external object information includes at least one of information about presence of an object, information about a location of the object, information about a distance between the receiving UE and the object, or information about a relative speed of the receiving UE with respect to the object.

* * * * *